(12) United States Patent
Blessing et al.

(10) Patent No.: US 9,726,231 B2
(45) Date of Patent: Aug. 8, 2017

(54) HYBRID DRIVETRAIN AND METHOD FOR OPERATING THE SAME

(71) Applicant: GERTRAG Getriebe- und Zahnradfabrik Hermann Hagenmeyer GmbH & Cie KG, Untergruppenbach (DE)

(72) Inventors: Uli Christian Blessing, Helbronn (DE); Thomas Hoffmeister, Korntal-Munchingen (DE); Hansi Gremplini, Ingersheim (DE)

(73) Assignee: GETRAG Getriebe- und Zahnradfabrik Hermann Hagen, Untergruppenbach (DE)

(*) Notice: Subject to any disclaimer, the term of this patent is extended or adjusted under 35 U.S.C. 154(b) by 77 days.

(21) Appl. No.: 14/783,421

(22) PCT Filed: Oct. 11, 2013

(86) PCT No.: PCT/EP2013/071331
§ 371 (c)(1),
(2) Date: Oct. 8, 2015

(87) PCT Pub. No.: WO2014/060321
PCT Pub. Date: Apr. 24, 2014

(65) Prior Publication Data
US 2016/0200188 A1     Jul. 14, 2016

(30) Foreign Application Priority Data
Oct. 19, 2012   (DE) .................. 10 2012 021 074

(51) Int. Cl.
*B60K 6/547*     (2007.10)
*F16D 25/10*     (2006.01)
(Continued)

(52) U.S. Cl.
CPC .............. *F16D 25/10* (2013.01); *B60K 6/387* (2013.01); *B60K 6/442* (2013.01); *B60K 6/48* (2013.01);
(Continued)

(58) Field of Classification Search
CPC .. B60K 6/38; B60K 6/50; F16D 25/10; F16D 25/0638; F16D 2021/0607
See application file for complete search history.

(56) References Cited

U.S. PATENT DOCUMENTS 7,287,634 B2    10/2007   Agner
7,648,012 B2*    1/2010   Gremplini ............... F16D 21/06
                                                      192/106 F
(Continued)

FOREIGN PATENT DOCUMENTS

CN           1637310 A      7/2005
CN           101029663       9/2007
(Continued)

OTHER PUBLICATIONS

International Search Report with English Translation, 15 pages.
(Continued)

*Primary Examiner* — Brian Swenson
(74) *Attorney, Agent, or Firm* — Reising Ethington P.C

(57) ABSTRACT

A hybrid drivetrain having an internal combustion engine which is designed for a maximum internal combustion engine rotational speed; a dual-clutch arrangement which has a first friction clutch and a second friction clutch with a common input element and in each case one output element; a transmission arrangement which has a first sub-transmission and a second sub-transmission; an electric machine connected to the output element of the second friction clutch via a machine transmission ratio ($i_M$), in such a way that a purely electric driving mode can be established via the
(Continued)

second sub-transmission. The electric machine is designed for a maximum machine rotational speed. The maximum machine rotational speed divided by the machine transmission ratio is greater than the maximum internal combustion engine rotational speed. The output element of the second friction clutch is structurally designed for the maximum machine rotational speed divided by the machine transmission ratio ($i_M$).

12 Claims, 3 Drawing Sheets

(51) Int. Cl.
| | |
|---|---|
| *B60K 6/387* | (2007.10) |
| *B60K 6/442* | (2007.10) |
| *B60K 6/50* | (2007.10) |
| *B60K 6/48* | (2007.10) |
| *F16D 25/0638* | (2006.01) |
| *F16D 21/06* | (2006.01) |

(52) U.S. Cl.
CPC ............... *B60K 6/50* (2013.01); *B60K 6/547* (2013.01); *F16D 21/06* (2013.01); *F16D 25/0638* (2013.01); *B60K 2006/4825* (2013.01); *F16D 2021/0607* (2013.01); *F16D 2021/0661* (2013.01); *F16D 2300/08* (2013.01); *Y02T 10/6221* (2013.01); *Y02T 10/6252* (2013.01); *Y10S 903/914* (2013.01); *Y10S 903/915* (2013.01)

(56) References Cited

U.S. PATENT DOCUMENTS

| | | | | |
|---|---|---|---|---|
| 7,712,594 | B2 | 5/2010 | Gremplini | |
| 8,608,615 | B2 | 12/2013 | Fuechtner | |
| 8,831,812 | B2* | 9/2014 | Blessing | B60K 6/48 701/22 |
| 9,260,109 | B2* | 2/2016 | Tanaka | B60K 6/36 |
| 2006/0196751 | A1 | 9/2006 | Schneider | |
| 2007/0004554 | A1* | 1/2007 | Hans | F16H 61/143 477/107 |
| 2007/0256907 | A1* | 11/2007 | Gremplini | F16D 21/06 192/48.619 |
| 2008/0236983 | A1 | 10/2008 | Kummer | |
| 2011/0240384 | A1* | 10/2011 | Roske | B60K 6/38 180/65.22 |
| 2012/0142472 | A1 | 6/2012 | Samie | |

FOREIGN PATENT DOCUMENTS

| | | |
|---|---|---|
| DE | 102007027121 A1 | 12/2008 |
| DE | 102007050659 A1 | 4/2009 |
| DE | 102010004711 A1 | 7/2011 |
| DE | 102010005754 A1 | 8/2011 |
| DE | 102010044618 | 3/2012 |
| DE | 102011016131 A1 | 10/2012 |

OTHER PUBLICATIONS

Chinese Office Action for Application No. 201380054184.3 Dated Aug. 2, 2016, 6 pages.
English Translation of Chinese Office Action for Application No. 201380054184.3 Dated Aug. 2, 2016, 9 pages.

* cited by examiner

HYBRID DRIVETRAIN AND METHOD FOR OPERATING THE SAME

CROSS REFERENCE TO RELATED APPLICATIONS

This application claims the priority of German patent application 10 2012 021 074.4 filed on Oct. 19, 2012.

BACKGROUND

The present invention relates to a hybrid drivetrain, having an internal combustion engine which is designed for a maximum internal combustion engine rotational speed; a dual-clutch arrangement which has a first friction clutch and a second friction clutch, wherein the friction clutches have a common input element, coupled to the internal combustion engine, and in each case one output element; a transmission arrangement which has a first sub-transmission and a second sub-transmission, wherein the output element of the first friction clutch is connected to an input of the first sub-transmission, and wherein the output element of the second friction clutch is connected to an input of the second sub-transmission; an electric machine which is or can be connected to the output element of the second friction clutch via a machine transmission ratio, in such a way that a purely electric driving mode can be established via the second sub-transmission, wherein the electric machine is designed for a maximum machine rotational speed.

In addition, the present invention relates to a method for operating such a hybrid drivetrain.

Such a hybrid drivetrain is suitable, in particular, for use in motor vehicles such as passenger cars. The drivetrain has a dual-clutch transmission with the abovementioned dual-clutch arrangement and the abovementioned transmission arrangement. The method of operation of such dual-clutch transmissions is generally known. The one transmission is generally assigned the uneven gearspeeds and the other sub-transmission the even gearspeeds in this context. When driving in a gearspeed via one of the sub-transmissions, a target gearspeed can be preselected in the other sub-transmission. A gear change can then be brought about by overlapping activation of the two friction clutches without an interruption in the tractive force.

Such dual-clutch transmissions are suitable, in particular, for implementing a hybrid drivetrain.

Whereas in conventional drivetrains an electric machine which is designed to make driving power available is arranged in the region of an output of the internal combustion engine, in a dual-clutch transmission it is preferred to connect an electric machine to an input of one of the sub-transmissions. The connection can be made here via a further clutch in such a way that the electric machine can be decoupled from the rest of the drivetrain. However, for cost reasons it is also generally preferred if the electric machine is permanently connected to the input of the one sub-transmission.

In this embodiment, when the friction clutch which is assigned to this sub-transmission is opened, it is generally possible to establish a purely electric driving mode via the gearspeeds of this sub-transmission. In the purely electric method of operation of the hybrid drivetrain, an interruption in the tractive force occurs when there are gear changes.

Of course, such a drivetrain can also be designed for a purely internal combustion engine method of operation in which the electric machine is either decoupled or else idles. Finally, with such a drivetrain it is also possible to establish a hybrid driving mode in which driving power is made available both by the internal combustion engine and by the electric machine.

Finally, with such a drivetrain it is also possible to implement further hybrid functions such as, for example, starting of the internal combustion engine by means of the electric machine, recuperation in an overrun mode of the drivetrain etc.

SUMMARY

Against this background, an object of the invention is to specify a hybrid drivetrain and a method for operating a hybrid drivetrain, wherein the comfort can be improved.

The subject is achieved in the hybrid drivetrain of the type mentioned at the beginning in that the maximum machine rotational speed is greater than the maximum internal combustion engine rotational speed, wherein the output element of the second friction clutch is structurally designed for the maximum machine rotational speed divided by the machine transmission ratio.

In addition, the above object is achieved by means of a method for operating a hybrid drivetrain of the inventive type in a motor vehicle, having the step of engaging the lowest gearspeed of the second sub-transmission for a purely electric driving mode and of using the electric machine for a velocity range of the motor vehicle from 0 km/h to at least 80 km/h, in particular to at least 100 km/h and preferably to at least 120 km/h, without performing a change of gearspeed in the second sub-transmission.

In previous hybrid drivetrains, the power-transmitting components have generally been designed for the maximum rotational speed of the internal combustion engine. Although electric machines can generally also be designed for relatively high rotational speeds, such electric machines are generally operated in hybrid drivetrains exclusively in such a way that their maximum rotational speed is equal to the maximum rotational speed of the internal combustion engine.

In such a hybrid drivetrain in which the electric machine is coupled to the output element of the second friction clutch, the output element of the second friction clutch is consequently driven in the prior art up to a maximum rotational speed which is equal to the maximum rotational speed of the internal combustion engine.

This point of view does not take into account fault states. The specified rotational speed values relate exclusively to a correct use or method of operation of the drivetrain.

In addition, in the prior art it is generally the case that in a typical motor vehicle transmission with five, six, seven or more forward gearspeeds, the lowest gearspeed of the second sub-transmission (preferably that transmission which includes the even gearspeeds) is designed in such a way that the maximum velocity in this lowest gearspeed is lower than 70 km/h (there are exceptions by all events in the case of sports cars).

Therefore, for a purely electric method of operation in which an electric driving mode also takes place, for example, above 100 km/h, a gear change must take place in the second sub-transmission, which involves an interruption of the tractive force.

By means of the inventive measure according to which the maximum machine rotational speed divided by the machine transmission ratio is greater than the maximum internal combustion engine rotational speed, the lowest gearspeed of the second sub-transmission can now be used over a relatively larger velocity range, with the result that a purely electric driving mode can be largely implemented without any change of gearspeed.

Accordingly, the comfort of the hybrid drivetrain can be significantly improved.

The object is therefore completely achieved.

According to one particularly preferred embodiment, the maximum machine rotational speed is at least 50% greater than the maximum internal combustion engine rotational speed.

The maximum machine rotational speed is preferably at least 12,000 rpm, in particular at least 15,000 rpm.

The machine transmission ratio is preferably in the range from 1 to 2, in particular in the range from 1.2 to 2.

The maximum machine rotational speed divided by the machine transmission ratio is preferably at least 1.1 times, preferably at least 1.2 times and, in particular, at least 1.3 times as large as the maximum internal combustion engine rotational speed.

According to one particularly preferred embodiment, the second sub-transmission has a multiplicity of forward gearspeeds, wherein the maximum machine rotational speed divided by the machine transmission ratio is selected such that in the case of the purely electric driving mode a vehicle velocity range from 0 km/h to at least 80 km/h, in particular to at least 100 km/h and preferably to at least 120 km/h can be implemented by means of one of the forward gearspeeds (preferably of the lowest forward gearspeed) of the second sub-transmission.

In addition, in the case of the hybrid drivetrain according to the invention it is preferred if the second friction clutch is embodied as a wet-running multi-disk clutch, wherein the output element of the second friction clutch has a cage element which is connected in the region of its inner circumference to an input shaft of the second sub-transmission and which is connected in the region of its outer circumference to a multi-disk carrier of the second friction clutch.

In this context, it is particularly preferred if the cage element is embodied in such a way that the moment of inertia is minimized.

In particular it is preferred if the cage element is designed for rotational speeds which are higher than 8,000 rpm, in particular higher than 9,000 rpm.

In addition it is preferred if components of the hybrid drivetrain located downstream of the output element of the second friction clutch in the direction of power flux are also designed for relatively high rotational speeds. This applies, in particular, to a wheel set which forms the lowest gearspeed of the second sub-transmission and the assigned shaft and synchronization thereof.

A differential of the drivetrain which is assigned to the driven axle is preferably designed here in any case for relatively high rotational speeds, with the result that no changes are necessary in this respect.

Overall, depending on the embodiment, with the present invention at least one of the following advantages or features may be implemented.

By means of a suitable configuration and/or reinforcement of the output element of the second friction clutch it is possible to operate the opened second friction clutch with relatively high rotational speeds. Consequently, relatively high rotational speeds with which the velocity ranges described above can be implemented on the secondary side of the second friction clutch.

In the prior art, the configuration criterion of the maximum continuous loading of the second friction clutch is the maximum rotational speed of the internal combustion engine (if appropriate plus a certain reserve). In this context, the internal combustion engine is considered to be the primary drive unit, with the result that during the operation of such a drivetrain according to the prior art relatively high rotational speeds occur only in the event of a fault or of misuse, and during the configuration they are considered to be an unacceptable, non-active continuous operating state.

As described above, in the prior art the comfort of the drivetrain is reduced.

Through suitable structural measures, the second friction clutch is designed for the increased rotational speeds. In particular, the effective diameter of multi-disk metal plates can be reduced significantly through, for example, a bent or oblique profile, with the result that a lever arm is made smaller.

When the drivetrain is operated it is preferred if a safety function is implemented in a control device or software of the control device, which control device ensures that the second friction clutch is not closed in the case of rotational speeds of the output element of the second friction clutch above the maximum internal combustion engine rotational speed. This is because otherwise the internal combustion engine could be entrained at an excessively high rotational speed and damaged.

By means of the measure according to the invention, individual components of the entire drivetrain can continue to be utilized individually, with the result that, for example in the case of a conventional dual-clutch transmission, higher towing speeds can be implemented. Generally, through the inventive connection of the electric machine to a dual-clutch transmission in the hybrid drivetrain according to the invention the purely electric velocity range is increased without switching in the second sub-transmission with an interruption of the tractive force having to take place.

The electric machine is preferably connected to the second sub-transmission to which preferably the even forward gearspeeds are assigned. Alternatively it is also possible to connect the electric machine to the first sub-transmission to which preferably the uneven forward gearspeeds are assigned.

It is generally possible, as described above, to connect the electric machine permanently to the input of one of the sub-transmissions (or to the corresponding output element assigned friction clutch). Alternatively it is possible to be able to decouple the electric machine by means of a clutch, or else alternatively to connect it via a suitable coupling device to the input of the first, or to the input of the second, sub-transmission.

Of course, the features mentioned above and those still to be explained below can be used not only in the respectively specified combination but also in other combinations or alone without departing from the scope of the present invention.

BRIEF DESCRIPTION OF THE DRAWINGS

Exemplary embodiments of the invention are illustrated in the drawing and explained in more detail in the following description, in which.

DETAILED DESCRIPTION

Figure 1:
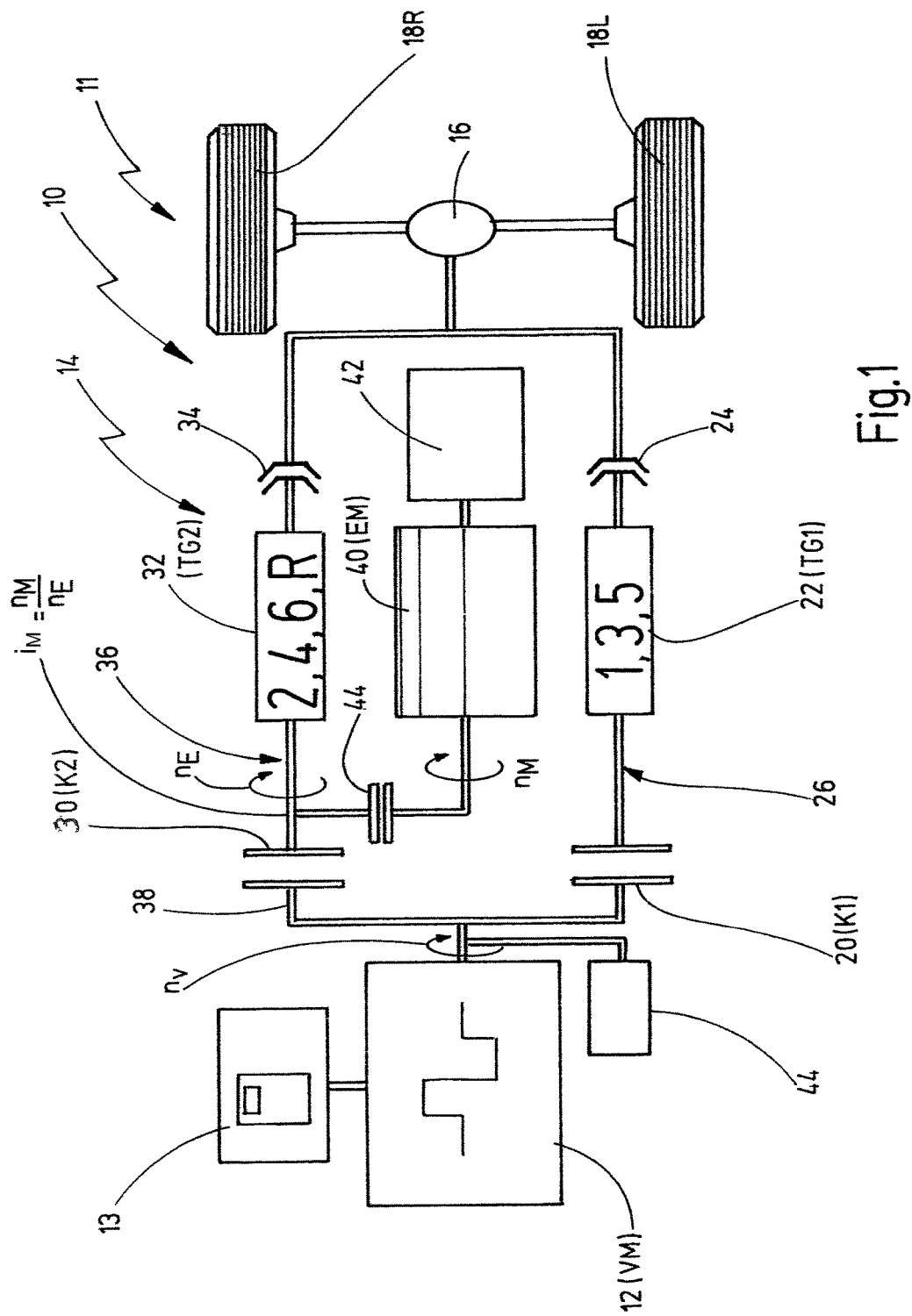
FIG. 1 shows a schematic illustration of a hybrid drivetrain according to the invention.

In FIG. 1, a drivetrain for a motor vehicle 11 is generally denoted by 10. The motor vehicle 11 can be, for example, a passenger car.

The drivetrain 10 includes a drive engine 12, specifically in the form of an internal combustion engine which is supplied from an energy store such as a fuel tank 13. In addition, the drivetrain 10 contains a dual-clutch transmission (DCT/DKG) 14, the output side of which is connected to a differential 16. The differential 16 distributes driving power to a left-hand and right-hand driven wheel 18L, 18R.

The dual-clutch transmission 14 contains a first friction clutch 20 and a first sub-transmission 22. The first sub-transmission 22 contains, for example, the uneven gearspeeds 1, 3, 5, etc., which can be engaged and disengaged by means of assigned clutches 24. The first friction clutch 20 (K1) and the first sub-transmission 22 (TG1) form a first power transmission path for transmitting driving power from the drive engine 12 to the differential 16.

The dual-clutch transmission 14 also contains a second friction clutch 30 (K2) and a second sub-transmission 32 (TG2). The second sub-transmission 32 contains, for example, forward gearspeeds 2, 4, 6 which can be engaged and disengaged by means of schematically indicated clutches 34. A reverse gearspeed can be assigned to the first or second sub-transmission. The reverse gearspeed R is assigned here to the second sub-transmission 32. The second friction clutch 30 and the second sub-transmission 32 form a second power transmission path for transmitting power from the drive engine 12 to the differential 16.

An output of the first friction clutch 20, or an input of the first sub-transmission 22, is denoted by 26 in FIG. 1. An output of the second friction clutch 30, or an input of the second sub-transmission 32, is denoted by 36 in FIG. 1. The two friction clutches 20, 30 have a common input element 38 which is preferably connected in a rotationally fixed fashion to a crankshaft of the drive engine 12. The rotational speed of the crankshaft or of the input element 38 is represented by $n_v$ in FIG. 1.

The drivetrain 10 also contains an electric machine (EM) 40 which is connected to an arrangement 42 for actuating and supplying energy. The arrangement 42 may contain, for example, power electronics and a battery. The rotational speed of the electric machine is shown by $n_M$ in FIG. 1. The rotational speed of the input 36 of the second sub-transmission 32 is shown by $n_E$ in FIG. 1.

The electric machine 40 is preferably permanently connected to the output of the second friction clutch 30 or the input of the second sub-transmission 32, for example by means of a spur gear set or the like. Alternatively, the electric machine 40 can be connected to the input of the second sub-transmission 32 by means of a coupling arrangement 44 (for example in the form of a clutch). The coupling arrangement 44 can also be switchable, with the result that the output of the electric machine 40 can alternatively be connected to the input 36 of the second sub-transmission 32 or to the input 26 of the first sub-transmission 22.

The connection of the electric machine 40 to the second sub-transmission permits electric driving here in virtually all operating situations, in particular even in the reverse gear.

The drivetrain 10 is configured to operate in three different operating modes. In a conventional drive mode, driving power is generated only by the drive engine 12. Gearspeed changes take place in a fashion which is free of interruption of the tractive force in that driving power is conducted via one of the power transmission paths, wherein a gearspeed is preselected in the sub-transmission of the other power transmission path. Subsequently, a gearspeed change takes place by transferring the power transmission flux from the one power transmission path to the other path by actuating the friction clutches 20, 30 in an overlapping fashion. This drive mode is generally known in the field of dual-clutch transmissions.

In addition, a hybrid drive mode can be established in which driving power is made available both by the drive engine 12 and by the electric machine 40. In this context, the driving power values can be added essentially via the summing point at the input 36 of the second sub-transmission 32 (or in the direction of power flux down-stream of the second friction clutch 30). A further possibility of a hybrid drive mode is that driving power is transmitted from the electric machine via the one sub-transmission, and driving power from the internal combustion engine is transmitted via the other sub-transmission, wherein a summing point is then present at the differential. In the hybrid drive mode, the electric machine can provide both a positive and a negative torque (boosting mode or increasing of load point/charging/recuperation).

Finally, a third drive mode is possible in which only the electric machine 40 is actuated in order to generate driving power, whereas the drive engine 12 is deactivated. Since the electric machine 40 is connected on the secondary side of the second friction clutch 30, in this operating mode the conventional shift sequences of a dual-clutch transmission cannot be applied. If gear changes take place in the electric drive mode in this type of hybrid drivetrain layout, these gear changes consequently take place with interruption of the tractive force. The second friction clutch 30 is generally opened in the purely electric operating mode. In order, for example, to carry out a traction upshift from the gearspeed 2 into the gearspeed 4, the torque which is made available by the electric machine 40 must be reduced in order to disengage the starting gear. During the engagement of the target gearspeed, the electric machine 40 likewise makes no torque available here, since otherwise, under certain circumstances, no synchronization can take place at the assigned clutch 34.

The electric machine 40 is connected to the input 36 of the second sub-transmission 32 via a machine transmission ratio $i_M$ which is calculated as $n_M/n_E$. The machine transmission ratio $i_M$ may be 1. In this case, the electric machine 40 can, for example, also be arranged coaxially with respect to an input shaft of the second sub-transmission 32. However, the electric machine 40 is preferably connected to the input 36 of the second sub-transmission 32 via a spur gear stage, for example to a gear wheel which is assigned to one of the forward gearspeeds of the second sub-transmission 32.

The transmission ratio of the spur gear stage corresponds in this case to the machine transmission ratio. The machine transmission ratio is preferably in a range greater than 1 to 2, and, in particular, in a range from 1.2 to 2.

The internal combustion engine 12 is designed for a maximum internal combustion engine rotational speed which can be, for example, in the region of 4500 rpm in the case of diesel engines, and in the region of 6500 rpm to 7500 rpm in the case of internal combustion engines. These are customary maximum internal combustion engine rotational speeds, wherein specialized vehicles can also reach relatively high rotational speeds (for example sports cars).

While in the prior art the electric machine 40 is configured and actuated in such a way that the maximum machine rotational speed divided by the machine transmission ratio (i.e. the rotational speed $n_E$) is at maximum equal to the maximum internal combustion engine rotational speed, there is provision here that the maximum machine rotational speed divided by the machine transmission ratio is greater than the maximum internal combustion engine rotational speed, to be precise, in particular, at least 1.1 times as high as the maximum internal combustion engine rotational speed, preferably at least 1.2 times as high, in particular 1.3 times as high and preferably at least 1.4 times as high as the maximum internal combustion engine rotational speed.

The output element of the second friction clutch 30 and the assigned components of the second sub-transmission 32 are structurally designed for this relatively high rotational speed.

As a result of this measure it is possible to be able to operate the motor vehicle 11 in a purely electric driving mode with a significantly greater velocity range, without having to perform gear changes in the second sub-transmission 32.

This is illustrated with reference to an example. For example, purely electric driving up to 120 km/h without a gear change in the second sub-transmission 32 is to take place.

A maximum internal combustion engine rotational speed of 6000 rpm and a total transmission ratio of 9 in the forward gearspeed 2 is assumed.

Therefore, for example in the case of customary dynamic wheel diameters a maximum velocity in the purely internal combustion engine mode via the forward gearspeed 2 of approximately 80 km/h is obtained.

If the electric machine 40 is designed, for example, for a maximum rotational speed of 16,000 rpm and if the machine transmission ratio is, for example, 1.8, this results in a maximum velocity in the purely electric driving mode of approximately 120 km/h given the same dynamic wheel diameter.

Since a predominant part of the driving mode can be covered in the purely electric mode given a maximum velocity of, for example, 120 or 130 km/h, the purely electric driving mode can occur essentially without a gear change, consequently without an interruption of the tractive force.

Of course, the electric machine 40 also makes available a large torque at low rotational speed, with the result that starting by means of the electric machine is possible in the forward gearspeed 2.

Figure 2:
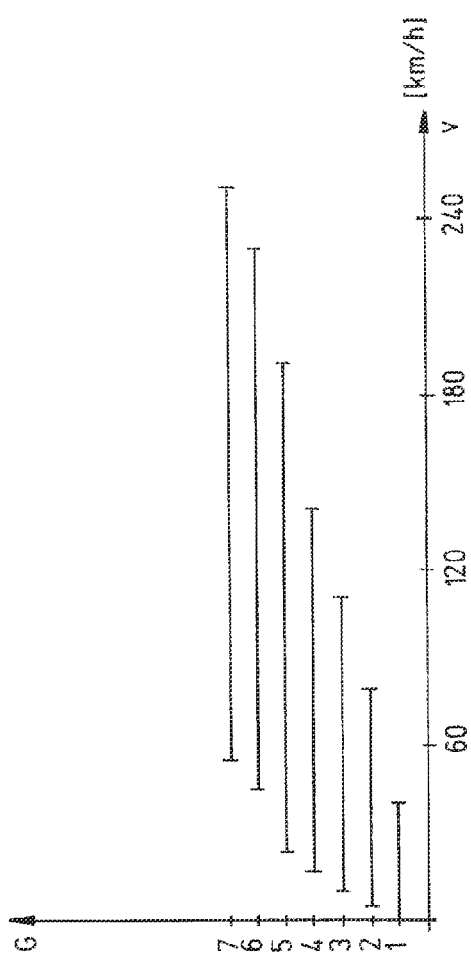
FIG. 2 shows a schematic diagram illustrating velocity ranges of forward gearspeeds of the hybrid drivetrain in FIG. 1 in a purely internal combustion engine operating mode.

FIG. 2 shows in a schematic form typical velocity ranges of gearspeeds of a step-by-step change speed gearbox for motor vehicles. A forward gearspeed 1 can be used, for example, up to a maximum velocity of 40 km/h. The forward gearspeed 2 can be used, for example, up to a maximum of 80 km/h. The third gearspeed can be used, for example, up to a maximum of 110 km/h. The fourth gearspeed can be used, for example, up to a maximum of 150 km/h and the fifth gearspeed up to, for example, a maximum of 190 km/h, the sixth gearspeed up to, for example, a maximum of 230 km/h and the seventh gearspeed up to, for example, a maximum of 250 km/h.

The minimum velocities in the respective gearspeeds are also per se rising in a customary way.

Figure 3:
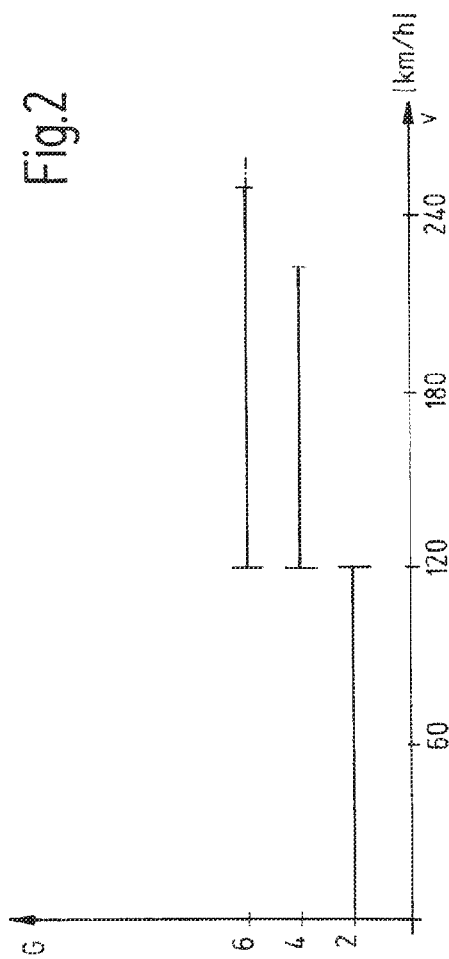
FIG. 3 shows an illustration, corresponding to FIG. 2, of a purely electric motor operating mode.

FIG. 3 now shows the inventive implementation of a method for operating a hybrid drivetrain of the type described above.

In this context, in the forward gearspeed 2 a velocity range from 0 km/h to 120 km/h is covered. Only if the vehicle is to be driven at relatively high velocities in the purely electric driving mode does a gear change occur either into the gearspeed 4 or the gearspeed 6, which can correspondingly establish relatively high rotational speeds or velocities.

In the case of the transmission ratios described above, the vehicle could be operated in the purely electric driving mode in the forward gearspeed 4, for example, up to approximately 225 km/h.

In practice, owing to the large resistances and the relatively low battery capacities, high velocities are generally not implemented in this way, at any rate not in a hybrid vehicle.

Figure 4:
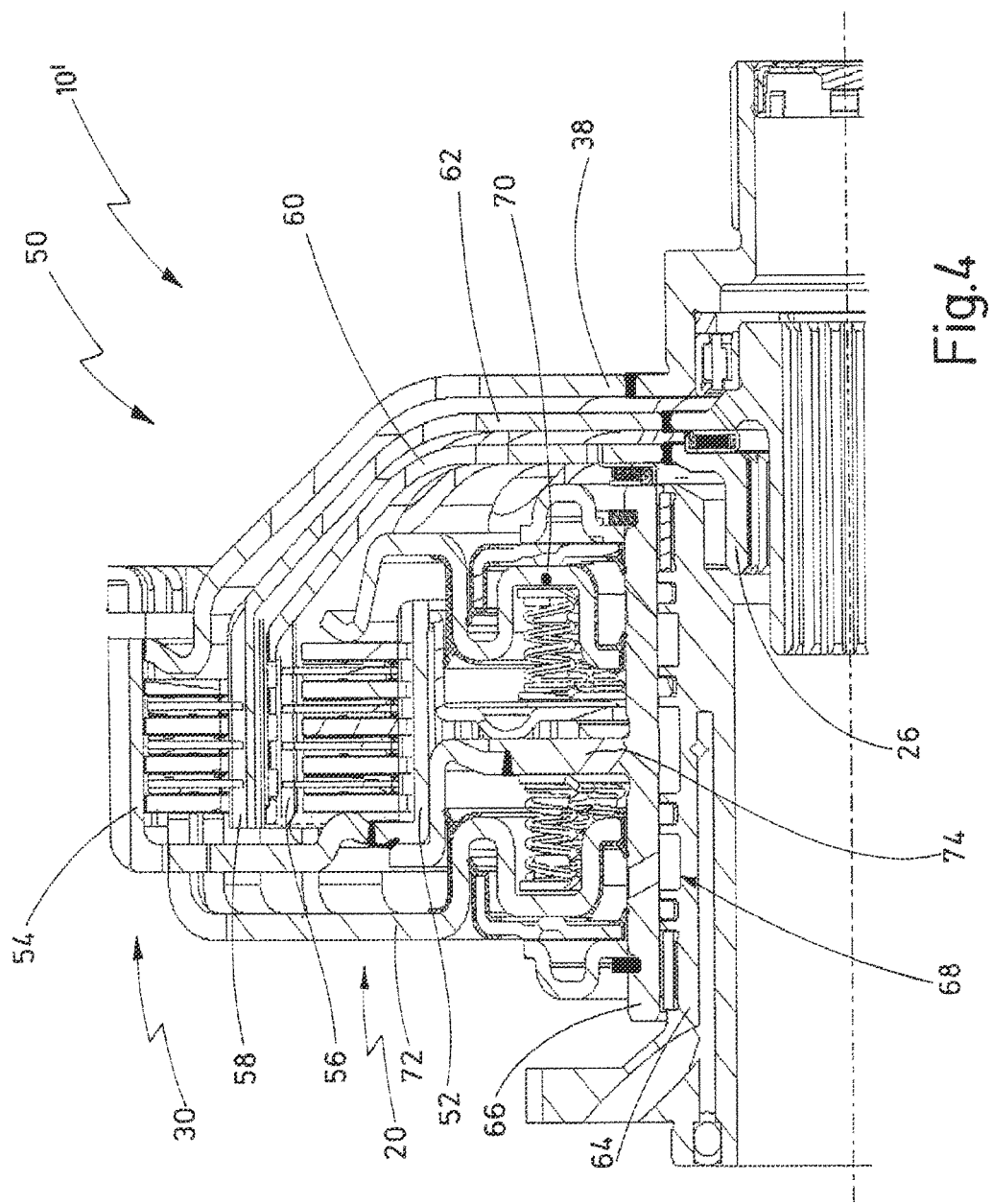
FIG. 4 shows a longitudinal sectional view through a dual-clutch arrangement according to an embodiment of a hybrid drivetrain of the type according to the invention.

FIG. 4 shows, in a schematic form, a further embodiment of a drivetrain 10' according to the invention, which can generally correspond in terms of design and method of functioning to the drivetrain 10 in FIG. 1. Identical elements are therefore characterized by identical reference symbols.

FIG. 4 shows here a dual-clutch arrangement 50 of the drivetrain 10' which contains the first friction clutch 20 and the second friction clutch 30. The two friction clutches 20, 30 are embodied here as wet-running multi-disk clutches which are arranged interleaved radially one inside the other, wherein the second friction clutch 30 is arranged radially outside the first friction clutch 20.

The dual-clutch arrangement 50 has a common input element 38 which is embodied here as a cage arrangement which surrounds the friction clutches essentially on both axial sides and radially. The input element 38 is connected to an inner multi-disk carrier 52 of the first friction clutch 20 and to an outer multi-disk carrier 54 of the second friction clutch 30.

The first friction clutch 20 also has an outer multi-disk carrier 56, and the second friction clutch 30 also has an inner multi-disk carrier 58.

The first friction clutch 20 has a first output element 60 which is embodied in a cage-like fashion and is connected to the outer multi-disk carrier 56 of the first friction clutch 20. In a corresponding way, the second friction clutch 30 has a second output element 62 which is embodied in a cage-like fashion and is connected to the inner multi-disk carrier 58 of the second friction clutch 30. The output element 60 of the first friction clutch 20 is connected to a shaft element which can be connected to the input 26 of the first sub-transmission 22. In a corresponding way, the second output element 62 of the second friction clutch 30 is connected to a shaft element which can be connected to the input 36 of the second sub-transmission 32.

The dual-clutch arrangement 50 also contains a hub 64 which is fixed to the housing and on which a hollow carrier shaft 66 is rotatably mounted. A hydraulic rotary feedthrough 68 is formed between the hub 64 and the carrier shaft 66. The carrier shaft 66 is rigidly connected to the input element 38 of the friction clutch arrangement 50. A first piston 70 for activating the first friction clutch 20 and a second piston 72 for activating the second friction clutch 30 are furthermore arranged on the carrier shaft 66, said pistons 70, 72 being arranged on axially opposite sides of a radial web 74 of the carrier shaft 66. By means of the inflation of cylinder spaces (not denoted in more detail), specifically via the rotary feedthrough 68, the pistons 70, 72 can be activated to open or close the friction clutches 20, 30.

In particular, the second output element 62 of the second friction clutch 30 is embodied here in such a way that it has a minimum moment of inertia in order in this way to design the output element 62 structurally for relatively high rotational speeds, which are, in particular, higher than the maximum internal combustion engine rotational speed, in particular higher than 1.2 times the maximum internal combustion engine rotational speed.

For this purpose, the second output element 62 is embodied in such a way that it establishes a connection between the shaft section 36 and the inner multi-disk carrier 58 on the shortest possible path. For this purpose, the second output element 62 is arranged directly adjacent to the first output element 60 or at a minimum distance. The first output element 60 is also shaped in such a way that it is at a minimum distance from adjacent components, including the first piston 70. As a result, the moment of inertia of the second output element 62 can be minimized, the output element 62 experiencing significantly higher rotational speeds in the purely electric driving mode than the maximum internal combustion engine rotational speed.

Of course, in the purely electric driving mode the second friction clutch 30 generally remains opened.

In a control device (not shown in more detail) of the drivetrain 10, 10', a safety circuit can be provided which reliably prevents (for example a reliable software section) the second friction clutch 30 from closing during a purely electric driving mode if as a result the maximum internal combustion engine rotational speed could be exceeded.

What is claimed is:

1. A hybrid drivetrain, having
    an internal combustion engine which is designed for a maximum internal combustion engine rotational speed;
    a dual-clutch arrangement which has a first friction clutch and a second friction clutch, wherein the friction clutches have a common input element coupled to the internal combustion engine and in each case one output element;
    a transmission arrangement which has a first sub-transmission and a second sub-transmission, wherein the output element of the first friction clutch is connected to an input of the first sub-transmission, and wherein the output element of the second friction clutch is connected to an input of the second sub-transmission; and
    an electric machine which is connected or can be connected to the output element of the second friction clutch via a machine transmission ratio ($i_M$) in such a way that a purely electric driving mode can be established via the second sub-transmission, wherein the electric machine is designed for a maximum machine rotational speed;
    wherein the hybrid drivetrain is configured so that the maximum machine rotational speed divided by the machine transmission ratio is greater than the maximum internal combustion engine rotational speed, and wherein the output element of the second friction clutch is structurally designed for the maximum machine rotational speed divided by the machine transmission ratio ($i_M$).

2. The hybrid drivetrain as claimed in claim 1, wherein the maximum machine rotational speed is at least 50% greater than the maximum internal combustion engine rotational speed.

3. The hybrid drivetrain as claimed in claim 1, wherein the maximum machine rotational speed is at least 12,000 rpm.

4. The hybrid drivetrain as claimed in claim 1, wherein the machine transmission ratio ($i_M$) is in the range from 1 to 2.

5. The hybrid drivetrain as claimed in claim 1, wherein the second sub-transmission has a multiplicity of forward gearspeeds, and wherein the maximum machine rotational speed divided by the machine transmission ratio is selected such that in the case of the purely electric driving mode a vehicle velocity range from 0 km/h to at least 80 km/h can be implemented by means of one of the forward gearspeeds of the second sub-transmission.

6. The hybrid drivetrain as claimed in claim 1, wherein the second friction clutch is embodied as a wet-running multi-disk clutch, wherein the output element of the second friction clutch has a cage element which is connected in the region of its inner circumference to an input shaft of the second sub-transmission and which is connected in the region of its outer circumference to a multi-disk carrier of the second friction clutch.

7. The hybrid drivetrain as claimed in claim 6, wherein the cage element is embodied in such a way that the moment of inertia is minimized.

8. The hybrid drivetrain as claimed in claim 1, wherein the output element of the second friction clutch is arranged directly adjacent or at a minimum distance from an output element of the first friction clutch, thereby minimizing a moment of inertia of the output element of the second friction clutch.

9. The hybrid drivetrain as claimed in claim 1, wherein the electric machine is connected to the output element of the second friction clutch via a spur gear set or a clutch with the machine transmission ratio (iM).

10. The hybrid drivetrain as claimed in claim 1, wherein the electric machine is connected to the output element of the second friction clutch, the output element of the second friction clutch is connected to the input of the second sub-transmission, and the second sub-transmission includes a plurality of forward gear speeds and a reverse gear speed so that a purely electric driving mode can be established via the second sub-transmission for a plurality of operating situations including reverse.

11. The hybrid drivetrain as claimed in claim 1, wherein the electric machine is connected to the output element of the second friction clutch, the output element of the second friction clutch is connected to the input of the second sub-transmission, and the second sub-transmission includes a plurality of even gear speeds so that a purely electric driving mode can be established using a lowest of the plurality of even gear speeds that achieves a vehicle velocity of at least 120 km/h without a gear change.

12. A method for operating a hybrid drivetrain in a motor vehicle, the hybrid drivetrain having an internal combustion engine which is designed for a maximum internal combustion engine rotational speed; a dual-clutch arrangement which has a first friction clutch and a second friction clutch, wherein the friction clutches have a common input element coupled to the internal combustion engine and in each case one output element; a transmission arrangement which has a first sub-transmission and a second sub-transmission, wherein the output element of the first friction clutch is connected to an input of the first sub-transmission, and wherein the output element of the second friction clutch is connected to an input of the second sub-transmission; an electric machine which is connected or which can be connected to the output element of the second friction clutch via a machine transmission ratio in such a way that a purely electric driving mode can be established via the second sub-transmission, wherein the electric machine is designed for a maximum machine rotational speed; and wherein the maximum machine rotational speed divided by the machine transmission ratio is greater than the maximum internal combustion engine rotational speed;
    the operational method having the step of engaging the lowest gearspeed of the second sub-transmission for a purely electric driving mode and of using the electric machine for a velocity range of the motor vehicle from 0 km/h to at least 80 km/h, without performing a change of gearspeed in the second sub-transmission.

\* \* \* \* \*